United States Patent [19]
Hanson

[11] Patent Number: 5,930,988
[45] Date of Patent: Aug. 3, 1999

[54] ON-THE-GO FROM THE TRACTOR SEAT WINDROW ADJUSTMENT

[75] Inventor: Brian Hanson, Hesston, Kans.

[73] Assignee: Hay & Forage Industries, Hesston, Kans.

[21] Appl. No.: 08/897,469

[22] Filed: Jul. 18, 1997

[51] Int. Cl.⁶ ..................................................... A01D 82/00
[52] U.S. Cl. ...................... 56/16.4 A; 56/192; 56/DIG. 7
[58] Field of Search ............................. 56/16.4 A, 16.4 B, 56/192, DIG. 7, DIG. 21

[56] References Cited

U.S. PATENT DOCUMENTS

| | | | |
|---|---|---|---|
| 3,683,602 | 8/1972 | Scarnato et al. | 56/192 X |
| 3,721,073 | 3/1973 | Scarnato et al. | 56/16.4 B |
| 4,099,364 | 7/1978 | Kanengieter et al. | 56/192 X |
| 5,031,393 | 7/1991 | Rostoucher | 56/192 X |

Primary Examiner—Terry Lee Melius
Attorney, Agent, or Firm—Hovey, Williams, Timmons & Collins

[57] ABSTRACT

The swathboard of a windrower can be remotely adjusted from the tractor seat and on-the-go using an electromechanical actuator or other remotely operated actuating device. When the swathboard is adjusted to its fully raised position, the stream of crop materials issuing from the conditioner rolls bypasses the swathboard and engages the forming shields to be converged into a windrow having a width determined by the outlet formed between the rear ends of the shields. At the other extreme, when the swathboard is fully lowered, the stream impinges against the swathboard and drops to the ground in a wide swath without ever engaging the forming shields. In any one of a number of intermediate positions, the swathboard can be used by the operator to deflect the stream to engage wider or narrower portions of the forming shields, thus controlling the width of the windrow.

3 Claims, 5 Drawing Sheets

ON-THE-GO FROM THE TRACTOR SEAT WINDROW ADJUSTMENT

TECHNICAL FIELD

The present invention relates to harvesters, particularly windrowers, and involves a way of remotely adjusting the swathboard of such a machine from the tractor seat and on-the-go so that the machine can be quickly and easily switched from windrows to swaths and the shape and size of the windrows can be readily adjusted.

BACKGROUND

Both self-propelled and pull-type windrowers are typically provided with both swathboards and windrow forming shields. These structures are located behind the conditioning mechanism of the machine generally in the path of travel of the stream of conditioned materials as they are discharged rearwardly through the air by the conditioning mechanism. The swathboard is located ahead of the forming shields but behind the conditioning mechanism. Accordingly, if the swathboard is lowered down into its operating position, the stream of crop materials will engage the swathboard and be directed down to the ground in a wide swath, never reaching the forming shields. On the other hand, if the swathboard is raised up to its standby position, the stream of materials passes by the retracted swath board and engages the forming shields, which converge the wide stream into a narrower flow and direct the material onto the ground into the shape of a windrow. Currently, however, all such adjustments of the swathboard must be carried out manually by the operator after leaving the tractor seat and walking to the rear of the header where the adjustment controls are located. This wastes valuable time and energy, as well as making it difficult to "fine tune" the swathboard without significant manual trial and error.

SUMMARY OF THE PRESENT INVENTION

Accordingly, one important object of the present invention is to provide for remote adjustment of the swathboard of a windrower on-the-go and from the tractor seat, whether the windrower is self-propelled or pull-type.

Another important object of this invention is to provide a simple, quick and convenient way for the operator to adjust the shape of the windrows produced by the machine without leaving the tractor seat and even while the machine is moving across the field.

The foregoing and other important objects of the present invention are achieved by replacing the manual adjustment means of the prior art with a remotely operated actuator for the swathboard that is capable of adjusting the swathboard between fully raised and fully lowered positions, as well as virtually any number of adjusted positions in between those two extremes. When the swathboard is fully lowered, the crop materials emanating from the conditioner mechanism engage the swathboard and are diverted to the ground to form a wide swath. When the swathboard is fully raised by the operator, the stream of materials bypasses the swathboard and is converged by the forming shields into a windrow. By carefully operating the remote actuator for the swathboard, the operator can select an intermediate position for the swathboard which causes crop materials to be deflected by the swathboard into engagement with corresponding forward or rearward portions of the forming shields. Depending upon the point at which the crop materials engage the forming shields, they will be converged to a greater or lessor extent, thus determining the width of the resulting windrow. The swathboard can thus be used by the operator to remotely adjust the shape of the windrow, without ever leaving the tractor seat.

BRIEF DESCRIPTION OF THE DRAWINGS

FIG. 2b is a schematic side elevational view of the conditioner, swathboard and forming shields corresponding to the condition of things in FIG. 2a;

FIG. 3b is a schematic side elevational view thereof corresponding to FIG. 3a;

DETAILED DESCRIPTION

Figure 1:
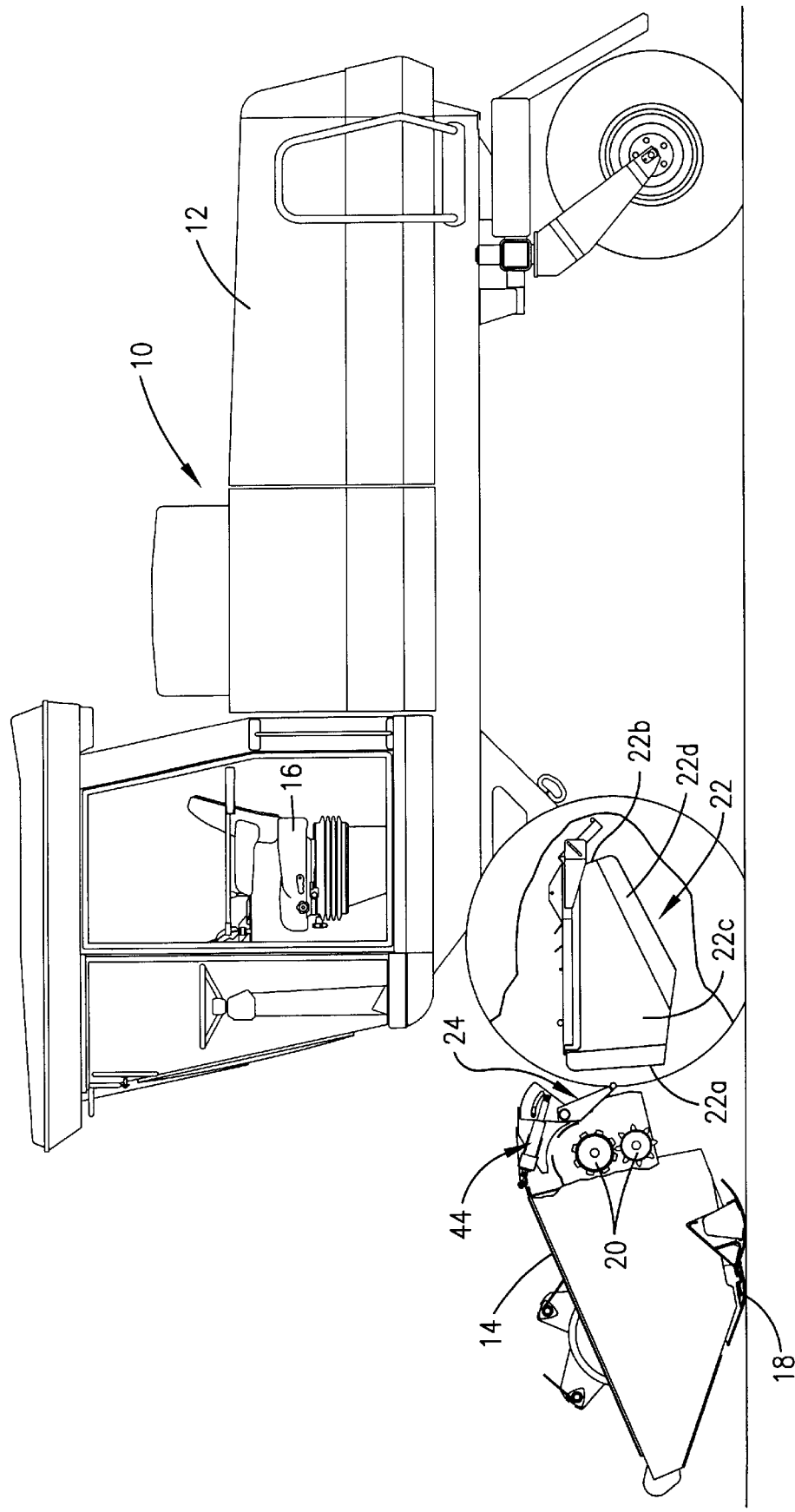
FIG. 1 is a schematic side elevational view of a self-propelled windrower embodying the principles of the present invention and capable of carrying out the novel method.

FIG. 1 illustrates the concepts of the present invention in connection with a self-propelled mower-conditioner or windrower 10. However, it will be appreciated that the scope of this invention is not limited to self-propelled machines. The concepts are equally applicable to pull-type machines, even though for the sake of illustration the invention has been disclosed in connection with a self-propelled machine. Furthermore, although harvesters which mow, condition and windrow crop materials are sometimes interchangeably referred to as mower-conditioners or windrowers, for the sake of simplicity, such machines will be referred to herein as "windrowers."

The windrower 10 broadly comprises a self-propelled tractor 12 and a harvesting header 14 attached to the front of the tractor 12. The operator drives the harvester 10 from the operator station or tractor seat 16, and from which he also operates the various components of the header 14, including those involved in the present invention.

In relevant part, the header 14 includes a cutter 18 for severing standing crops as the machine moves through the field, conditioning mechanism in the form of a pair of conditioner rolls 20, a pair of rearwardly converging windrow forming shields 22 behind the conditioner rolls 20, and a swathboard 24 located between the conditioner rolls 20 and the forming shields 22. In self-propelled harvesters, the forming shields 22 are typically supported partly by the header frame and partly by the tractor 12, while in pull-type harvesters the forming shields are typically carried on the header frame only.

Figure 5:
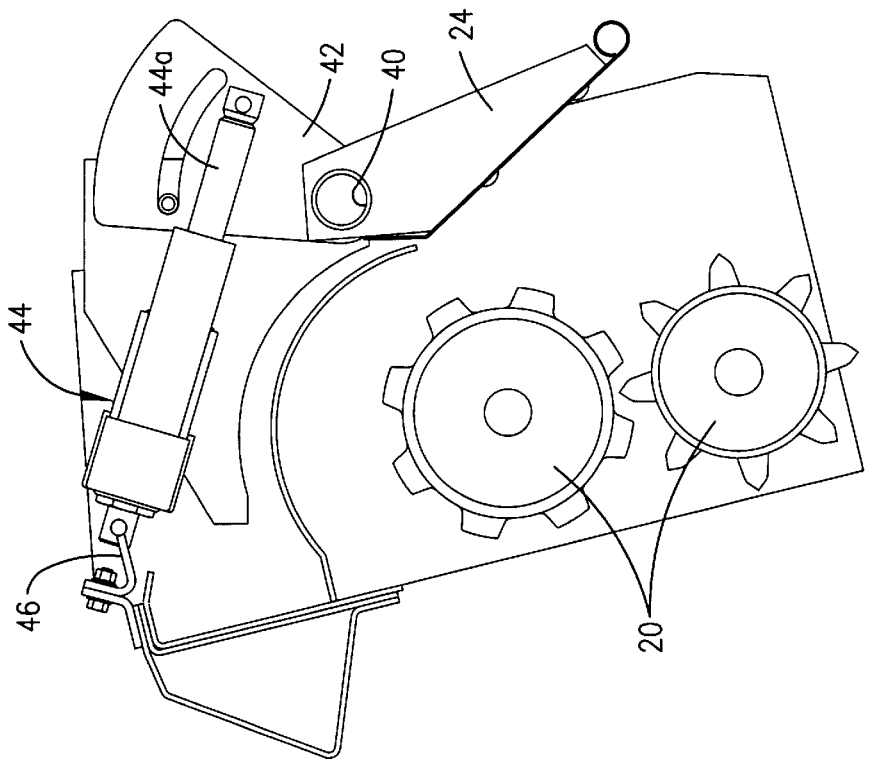
FIG. 5 is a fragmentary vertical cross-sectional view through the header showing the swathboard fully lowered.
Figure 4:
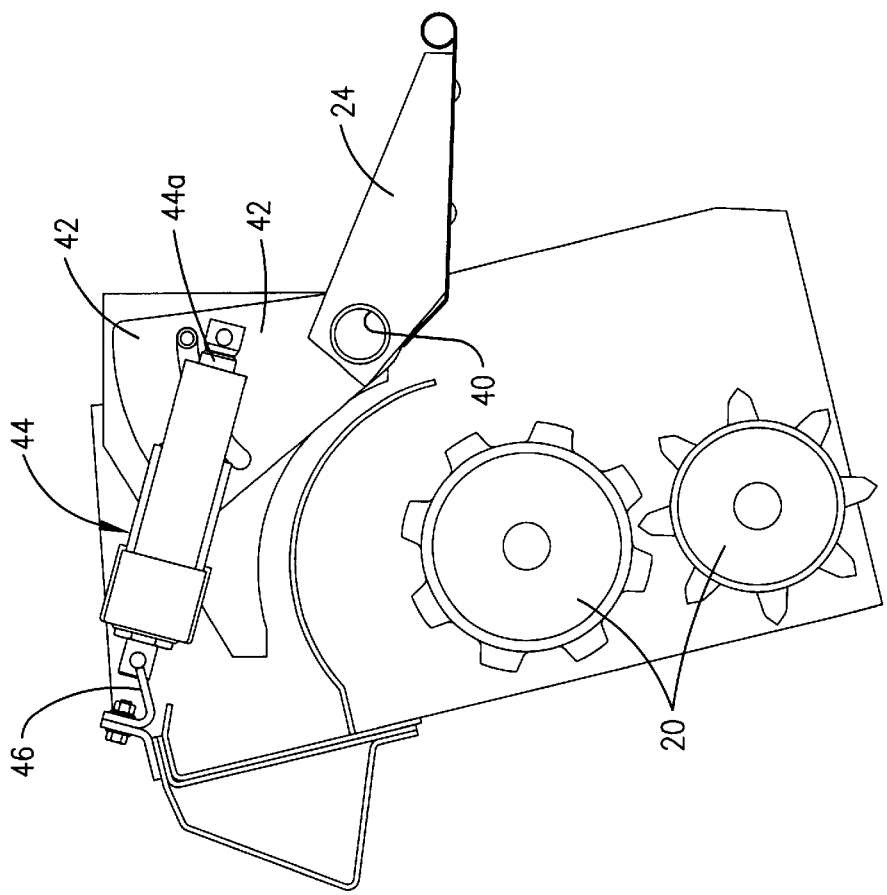
FIG. 4 is a fragmentary vertical cross-sectional view through the header showing the swathboard fully raised.

The conditioner rolls 20 have the characteristic of projecting a stream of conditioned materials rearwardly therefrom and toward the forming shields 22 and swathboard 24 as the crop materials issue from the rolls 20. If the swathboard 24 is fully raised as illustrated in FIG. 4, the stream bypasses the swathboard 24 and is acted upon by the shields 22 to form a windrow in accordance with the adjusted positions of the forming shields 22. On the other hand, if the swathboard 24 is fully lowered as illustrated in FIGS. 1 and 5, the stream will be intercepted by the swathboard 24 and directed down to the ground without ever engaging the forming shields 22. Consequently, a wide swath will be formed.

Each of the forming shields 22 has a front end 22a, a rear end 22b, and an elongated deflecting surface 22c extending between the front and rear ends 22a and 22b. The front ends 22a of the shields 22 are spaced apart by a distance that substantially corresponds to the width of the conditioner rolls 20 in a direction extending transversely of the path of travel of the machine, while the rear ends 22b of the shields 22 are spaced apart by a distance that is substantially less than such width. Consequently, it will be appreciated that the shields 22 converge rearwardly, somewhat in the nature of a funnel to correspondingly taper down the stream of crop materials issuing from the conditioner rolls 20 and impinging upon the shields 22. The front ends 22a of the shields 22 flare outwardly to a slight extent, while the lower rear margins 22d of the shields 22 are curled slightly inwardly.

Figure 6:
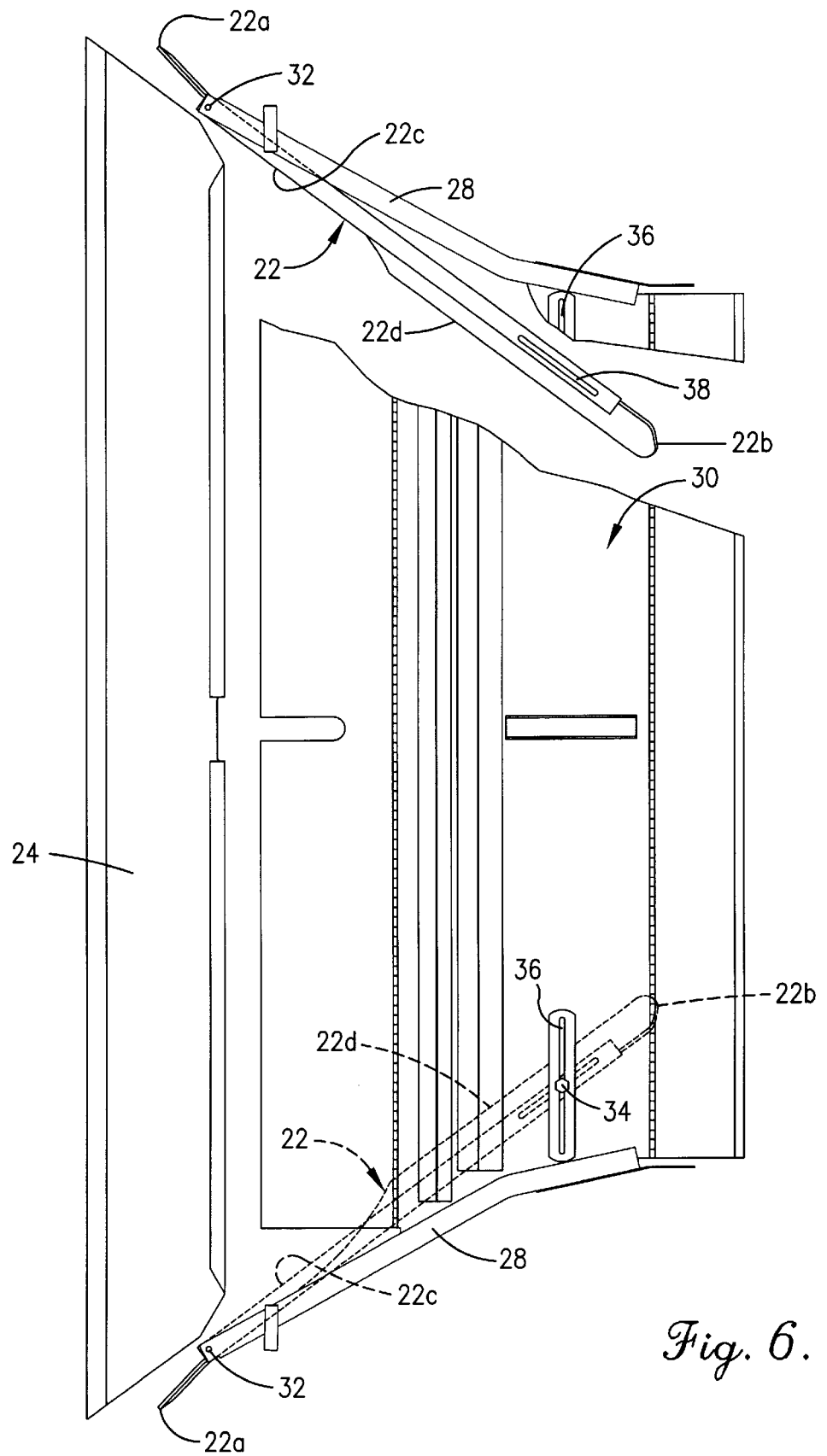
FIG. 6 is a schematic top plan view of the swathboard and forming shields of the header with parts broken away to reveal details of construction.

In the illustrated embodiment as shown particularly in FIG. 6, the shields 22 are supported by a frame that includes a pair of fore-and-aft, rearwardly converging members 28 and a top wall 30. The shields 22 are pivoted at their front ends 22a to the members 28 by pivots 32 and are adjustably supported by the top wall 30 near their rear ends 22b by releasable fasteners 34. The fasteners 34 pass through intersecting slots 36 and 38 in the top wall 30 and the forming shields 22 respectively.

As illustrated particularly in FIGS. 4 and 5, the swathboard 24 is fixed to a transversely extending tube 40. A crank 42 is fixed to the tube 40 and projects upwardly therefrom for rotating the crank 40 and thus the swathboard 24 between the fully raised position of FIG. 4 and the fully lowered position of FIG. 5. A remotely operated actuator 44 in the form of an electromechanical device is operably connected between the crank 42 and a mounting lug 46 on the frame of the header. The device contains a small, reversible electric motor which drives a worm gear (not shown) to extend and retract the rod 44a of the actuator. A suitable switch (not shown) is provided in the cab of the tractor 12 adjacent the seat 16 for energizing the motor in either selected direction. A suitable electromechanical actuator is readily available from a variety of sources, as are a number of other type actuators which would be suitable for remotely adjusting the swathboard 24.

With the swathboard 24 fully lowered as in FIGS. 1 and 5, the stream of crop material issuing from the conditioner rolls 20 impinges against the swathboard 24 and is directed to the ground in a full width swath. On the other hand, when the swathboard 24 is fully raised as in FIG. 4, the crop stream completely misses the swathboard 24 and is acted upon by the forming shields 22 to produce a windrow whose width is determined by the adjusted setting of the shields 22. Due to the ability to shift the swathboard 24 remotely from the tractor seat utilizing the actuator 44, the swathboard 24 can be operated between its two extreme positions on-the-go. Thus, the harvester 10 can be set up for swathing or windrowing quickly and easily while the machine is moving and without the operator leaving the tractor seat.

Moreover, because the actuator 44 can be stopped at any one of numerous intermediate positions by the operator without leaving the tractor seat, the shape of the windrow produced by the forming shields 22 can be quickly and easily adjusted using the swathboard 24. In this respect, as illustrated by comparing FIGS. 2a,2b with FIGS. 3a,3b it will be seen that the swathboard 20 may be used to cause the crop stream to engage the forming shields 22 at different positions along the fore-and-aft length of the deflecting surfaces, which will result in the shields 22 tapering down the crop stream to a greater or lesser extent depending upon the particular point of engagement.

Figure 2A:
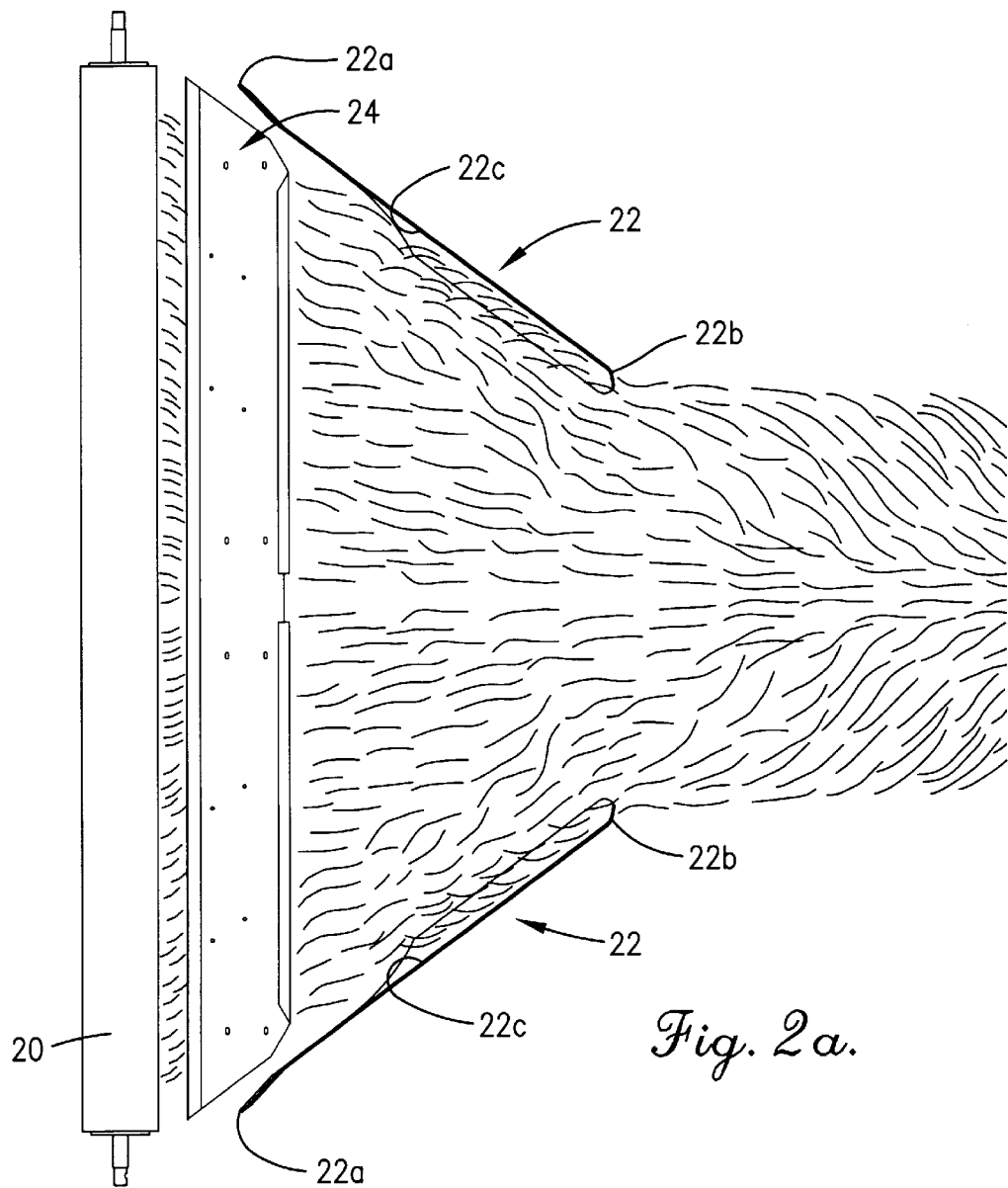
FIG. 2a is a schematic top plan view of the conditioner, swathboard and forming shields with the swathboard fully raised so that the forming shields produce a windrow.
Figure 2B:
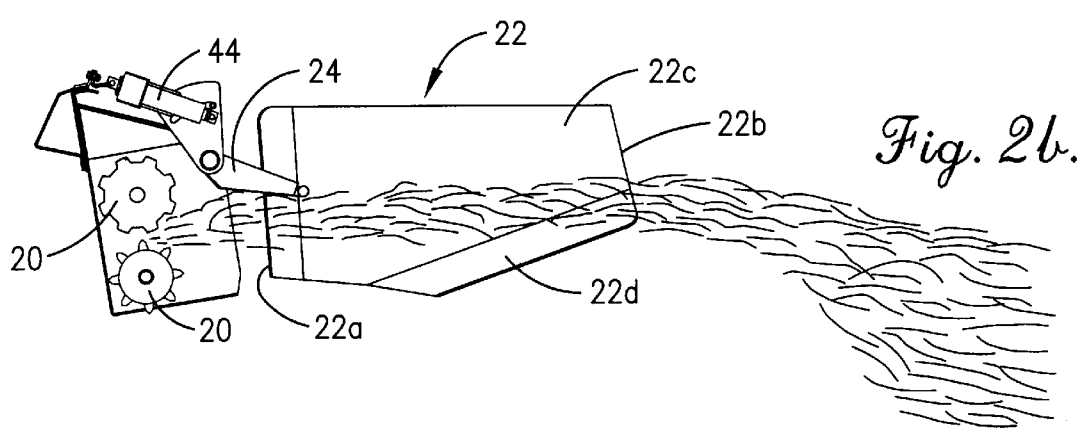

For example, FIGS. 2a and 2b illustrate that when the swathboard 24 is fully raised, the stream of crop material impinges against the deflecting surface 22c of the shields 22 all along the length thereof and issues from the shields 22 only through the open rear end of the funnel-like structure created by the convergence of the two shields 22. The stream is thus subjected to the full converging effect of the shields 22 to produce a windrow that is only as wide as the distance between the rear ends 22b of the shields 22.

Figure 3A:
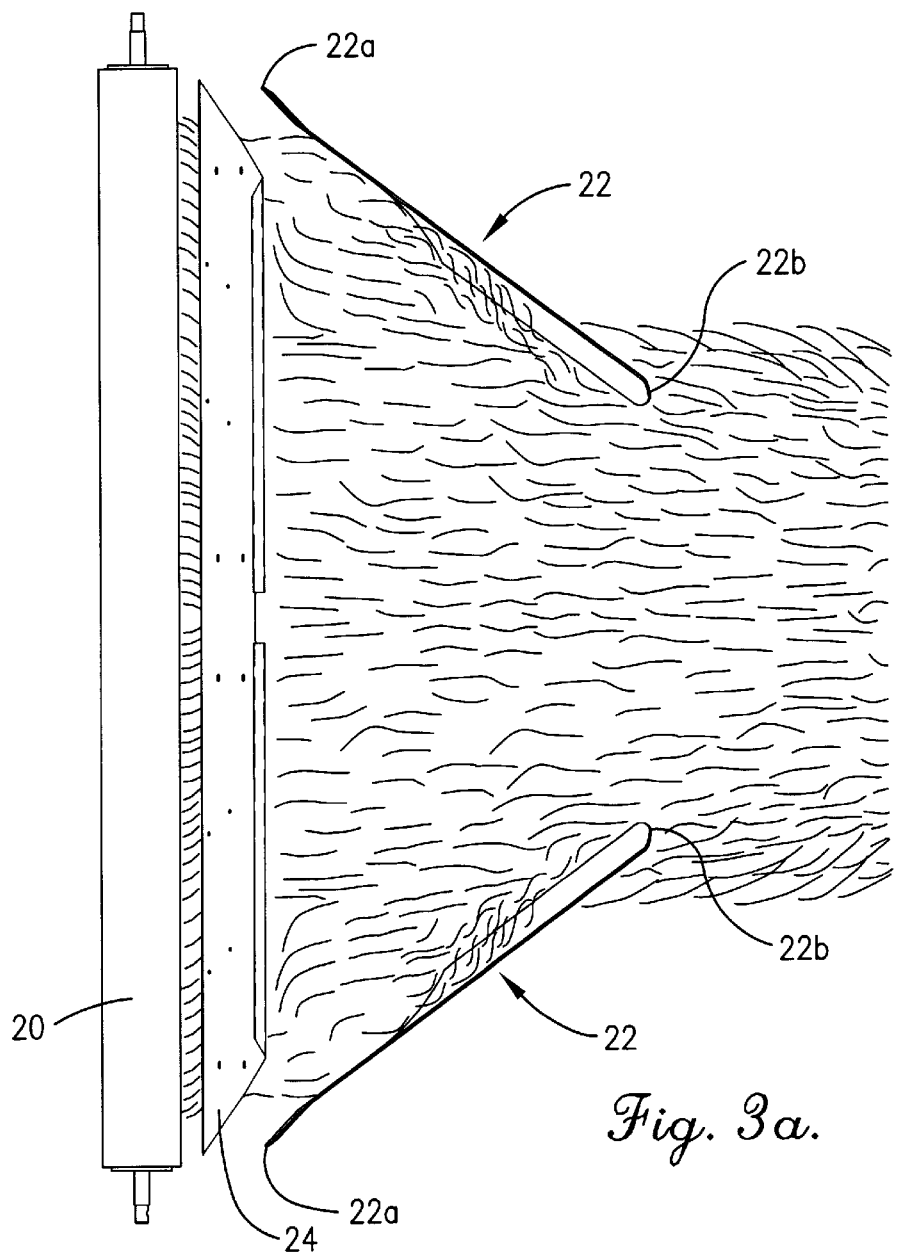
FIG. 3a is a schematic top plan view similar to FIG. 2a but showing the swathboard partially lowered to illustrate how the swathboard can be used to change the width of the windrow.
Figure 3B:
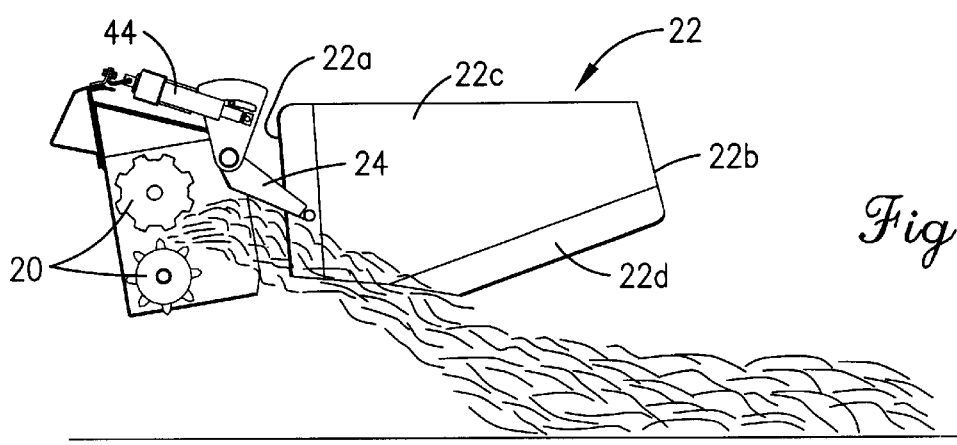

On the other hand, FIGS. 3a and 3b illustrate that, with the shields 22 at the same setting as FIGS. 2a and 2b, actuating the actuator 44 to place the swathboard 24 in an intermediate position causes the stream to strike the deflecting surfaces 22c of the shields 22 at a point further forwardly than in FIGS. 2a and 2b. Due to the fact that the "funnel" created by the forming shields 22 is wider at this forward location and the stream is directed somewhat downwardly by the swathboard 24, the stream issues more through the lower margins 22d of the shields in a wider windrow than when the swathboard is fully raised. Yet, the wider windrow is not as wide the swath would be if the swathboard 24 were fully lowered.

Accordingly, it will be seen that the operator at the tractor seat 16 has great freedom to adjust the width of the windrow without ever changing the setting of the shields 22 and without ever leaving the tractor seat. By simply flicking a switch, the operator can use the swathboard 24 to vary the width of the windrow from only a small amount to a significant change to suit the desires or needs of the operator and the field conditions at hand.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of their invention as pertains to any apparatus not materially departing from but outside the literal scope of the invention as set out in the following claims.

I claim:

1. In a windrower having mechanism for conditioning crop material severed from the field and for discharging the conditioned material in a rearwardly directed stream as the windrower moves across the field , the improvement comprising:

a pair of rearwardly converging windrow forming shields mounted for placement in the path of travel of the stream of conditioned material, said forming shields having front ends that are spaced apart substantially the full width of the conditioning mechanism, rear ends that are spaced apart substantially less than the full width of the conditioning mechanism, and elongated deflecting surfaces extending between said front and rear ends for engagement with the stream when the shields are placed in the path of travel of the stream;

a transverse swathboard between said crop conditioning mechanism and the forming shields along substantially the full width of the conditioning mechanism, said swathboard being mounted for adjusting movement between a fully raised position in which the stream of crop material passes beneath the swathboard for engagement with the forming shields to form a windrow on the ground and a fully lowered position in which the stream of crop material is diverted down to the ground ahead of the forming shields to form a swath; and a remotely operable actuator operably coupled with said swathboard for effecting said adjusting movement of the swathboard on-the-go, said actuator being operable to position and retain said swathboard in any one of the number of infinitely variable positions between said fully raised and fully lowered positions.

2. In a windrower as claimed in claim 1, said actuator comprising an electromechanical device.

3. A method of adjusting on-the-go the shape of windrows produced by the forming shields of a windrower comprising the steps of:

discharging a stream of conditioned crop materials rearwardly in a stream toward the forming shields while the windrower is moving across a field;

placing a swathboard in the path of travel of the stream ahead of the forming shields; and remotely adjusting the swathboard to one of a number of infinitely variable positions between a fully raised and fully lowered position from the operating station of the windrower to deflect the stream into engagement with those parts of the forming shields that will produce the desired width of windrow.

* * * * *